April 21, 1959 J. MULLER 2,883,056
FILTER APPARATUS AND FILTER CARTRIDGES THEREFOR
Filed Feb. 17, 1956 4 Sheets-Sheet 1
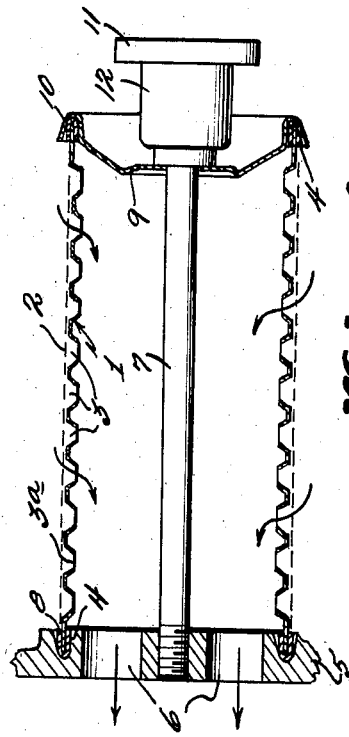
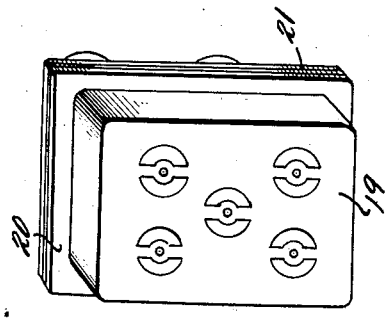
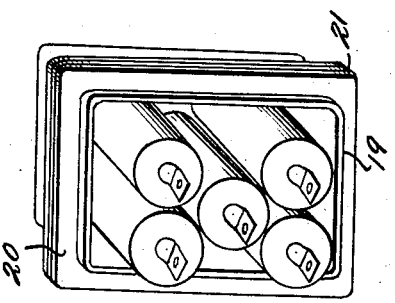
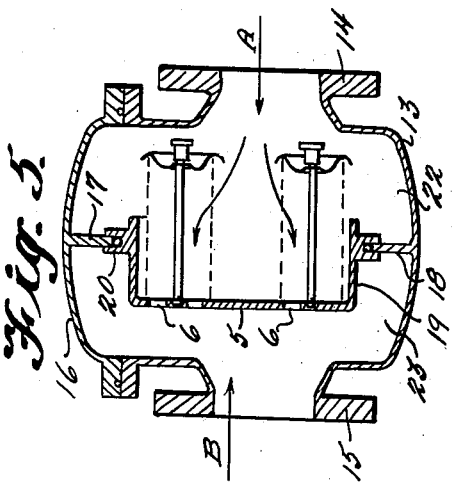
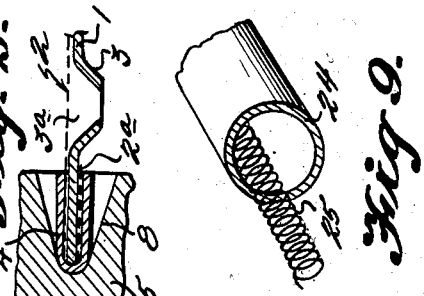
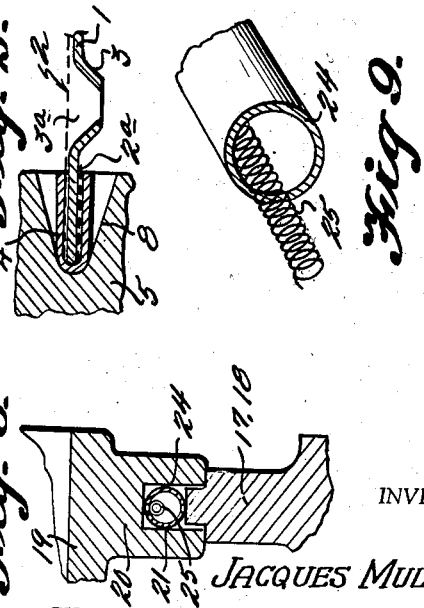
INVENTOR
JACQUES MULLER
BY Young, Emery + Thompson
ATTORNEYS April 21, 1959
J. MULLER
2,883,056
FILTER APPARATUS AND FILTER CARTRIDGES THEREFOR
Filed Feb. 17, 1956
4 Sheets-Sheet 2
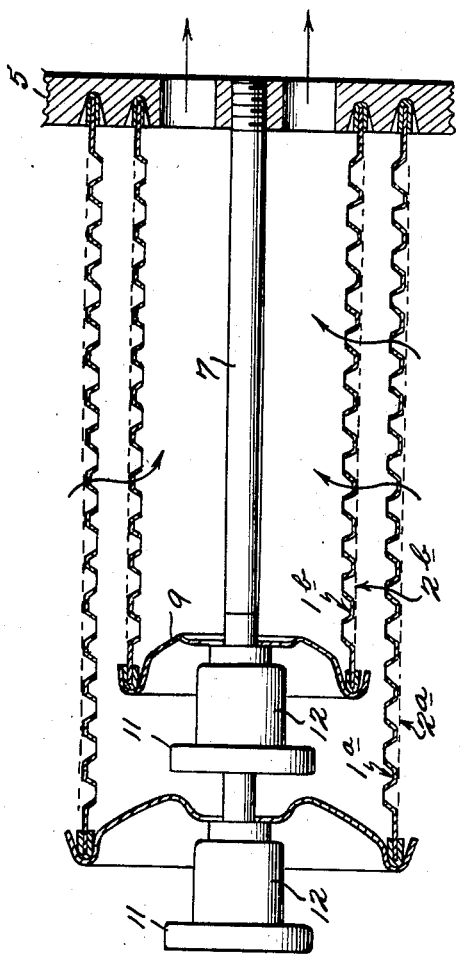
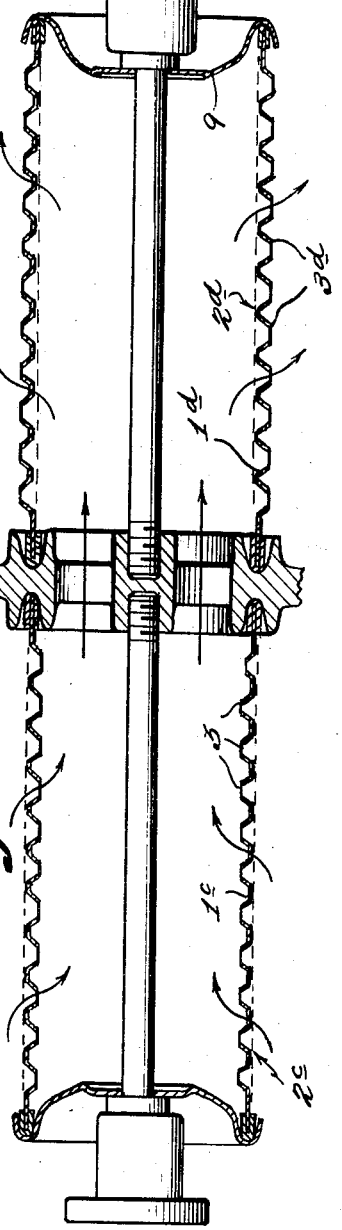
INVENTOR
JACQUES MULLER
By Young, Emery & Thompson
ATTORNEYS

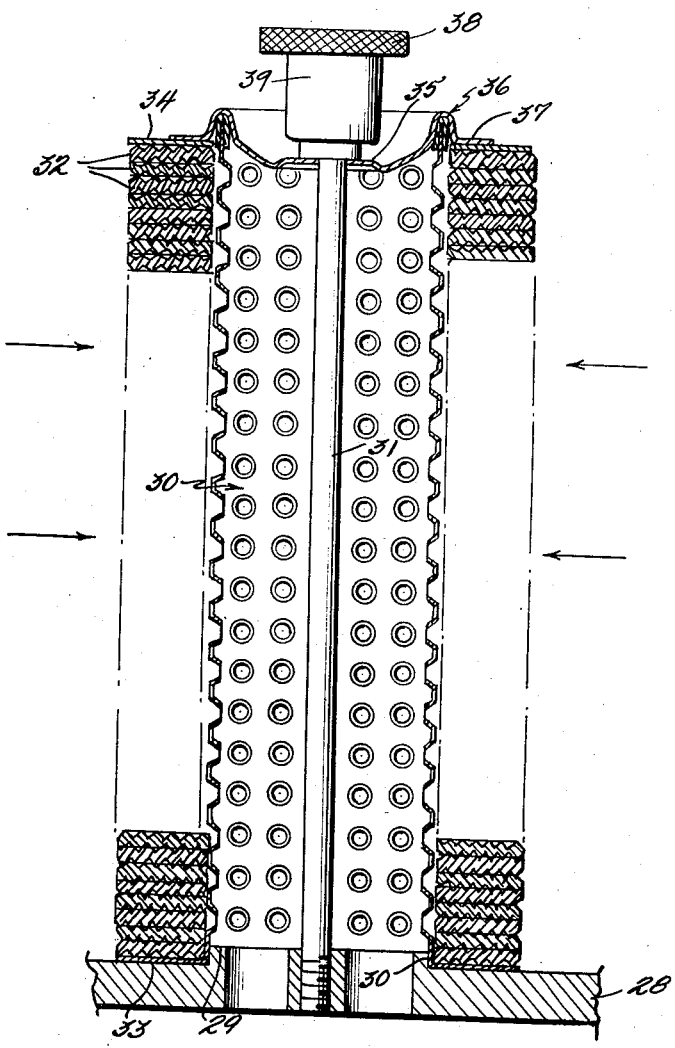

April 21, 1959  J. MULLER  2,883,056
FILTER APPARATUS AND FILTER CARTRIDGES THEREFOR
Filed Feb. 17, 1956  4 Sheets-Sheet 4

INVENTOR
JACQUES MULLER
BY Young, Emery + Thompson
ATTORNEYS

United States Patent Office 2,883,056
Patented Apr. 21, 1959

2,883,056
FILTER APPARATUS AND FILTER CARTRIDGES THEREFOR

Jacques Muller, La Garenne-Colombes, France

Application February 17, 1956, Serial No. 566,309

Claims priority, application France February 17, 1955

2 Claims. (Cl. 210—336)

The present invention relates to improvements in cartridges used in filtering various fluids and filtering apparatus using such cartridges.

An object is to provide filter cartridges comprising a tubular body or core carrying on its circumferential surface filter material and made of embossed sheet metal such as described in my copending patent application No. 448,980, filed August 10, 1954, now Patent No. 2,813,632. This sheet metal is formed by stamping numerous small cones projecting from one face only and perforated at their apices.

Another object is to provide a filter apparatus embodying a cartridge carrying partition.

For greater clearness there will now be described several modes of carrying out the invention with reference to the accompanying drawings in which:

Fig. 1 is an axial cross section of a simple cartridge.

Fig. 2 is a sectional view on a larger scale of a part of the simple cartridge.

Fig. 3 is a view in axial section of a cartridge formed of two concentric bodies.

Fig. 4 is a view in axial section of a cartridge formed of two axially aligned bodies.

Fig. 5 is a view in axial section of a filter equipped with simple cartridges of the type shown in Fig. 1.

Fig. 6 is a perspective view as seen in the direction of the arrow A in Fig. 5, showing one side of the cup supporting the cartridges.

Fig. 7 is a perspective view as seen in the direction of the arrow B of Fig. 5 and shows the other side of the cup.

Fig. 8 is a sectional view on a larger scale of the detail of the mounting of the cup supporting the cartridge in the housing of the filter.

Fig. 9 is a perspective sectional view of the sealing joint of the cartridge supporting cup.

Fig. 10 is an axial sectional view of a simple filter cartridge in which the filter material is formed of stacked discs with microgrooves on their two faces according to the principle described in my U.S. patent application No. 503,933 filed April 26, 1955.

As shown in Fig. 1, a simple cartridge according to the invention comprises a core or supporting element formed of a tubular body 1 of annular cross-section on the external surface of which is stretched a sleeve 2 of filter cloth or screen attached at its two ends by means which will be described in detail hereinafter.

Figure 11:
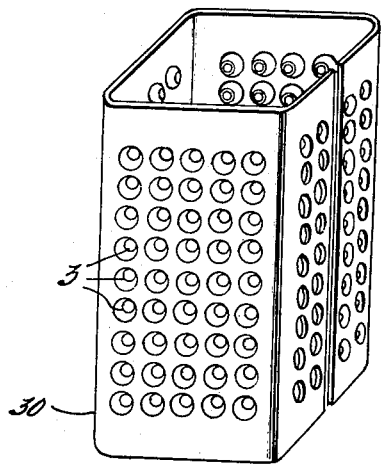
Fig. 11 is a perspective view of the tubular body of embossed sheet metal of the filter cartridge of Fig. 10.

The tubular body is made of embossed sheet metal of the kind in which are fashioned by stamping numerous small cones 3 (Fig. 2), the bases of which are very close to each other and which are perforated at their apices, all said cones projecting from one surface of the sheet. According to the invention this sheet metal is rolled or folded in a manner that all the cones extend towards the interior in order that the exterior peripheral surface of the tubular body will be perfectly smooth and displays only large orifices 3a very close together. Fig. 11 shows in perspective a tubular body of this type, but square in section. There can be seen the close disposition of the embossed cones 3 in the four faces of the body, the external surface having the appearance of a grid with large meshes.

The filter sleeve 2 is stretched over this grid of which the supporting ledges are of a reduced to the minimum width. The attachment of the filter sleeve 2 is effected at the ends of the body in the manner shown on a larger scale in Fig. 2. There is used for this purpose a filter sleeve longer than the body so that it is possible to turn back its ends 2a towards the interior and against the inner surface of the body. For the fixation there is used an annular collar or gasket 4 of U-shape cross-section to cap each end of the tubular body and wedge or clip the folded ends of the filter sleeve as clearly shown in Fig. 2. The annular collar or gasket 4 is made of a material capable of acting as a member for sealing fluid. The body and sleeve form an assembly which is removable and replaceable as a unit.

The unit is mounted on one face of a cartridge carrying partition 5 adapted to divide a filter chamber into an inlet compartment for fluid to be filtered and an outlet compartment for filtered fluid. In this partition is formed a plurality of orifices 6 in the center of which is fixed a rod 7 threaded at its free end. On the side of the partition carrying the rod there is an annular groove 8 surrounding the circular series of orifices the diameter of which groove is equal to that of the tubular body 1 so that it can receive one end of said body. On the free end of the rod is freely engaged a solid cap 9 the edge of which is profiled to form a sort of recess or gutter 10 of annular shape and of diameter equal to that of the body 1 so that said cap can cover the upper or outer end of said body. A clamping nut 11 engages the threads of the rod 7 and is provided with an expansion compensating device 12.

From the foregoing it is obvious that the mounting of a filter cartridge is very simple. Of course finished cartridges are made available, that is each is provided on its outer circumference with a filter sleeve 2 fixed at its ends as described above. After the nut 11 and the cap 9 are removed, a cartridge is placed about the rod 7 with its end engaged in the circular groove 8 in the partition. The cap 9 is then placed on the rod 7 and pushed against the outer end of the cartridge so that the recess or gutter 10 caps the edge of said end. Finally the nut 11 is screwed on the rod 7 and tightened so that the tubular body is properly secured. The tightening seals both ends of the cartridge by virtue of the annular collars or gaskets 4 which prevents leakage of liquid which has not been filtered.

Disassembling is simply effected by performing these steps in the reverse order.

Since the filter sleeve 2 is stretched over the outer circumference of the body 1 the filtering action must take place from the outside to the inside of the cartridge as indicated by the arrows in Fig. 1. Consequently the cartridge must be mounted in the inlet chamber of the fluid filter.

Fig. 3 shows how it is possible to filter a fluid twice using a cartridge with two concentric tubular bodies 1a and 1b each similar to the one shown in Fig. 1 and provided with filter sleeves 2a and 2b respectively. The two cartridges are similar except that the two bodies are mounted on a common central rod 7. It is possible to mount in this manner a number of concentric cartridges greater than two. The advantage of this arrangement resides in the fact that it is possible to use filter materials with narrower meshes in the direction of filtering so that the filter sleeves retain successively first the coarse impurities and then the foreign particles of greater and greater fineness.

In the form of construction shown in Fig. 4 the filtering is also effected in two stages but by means of two filter cartridges disposed in axial alignment, on opposite sides of the cartridge supporting partition 5. The tubular body 1c mounted in the inlet compartment is identical to that shown in Fig. 1 that is to say that the cones 3 perforated at their apices project towards the interior and the filter sleeve 2c is stretched about the exterior circumference so as to be applied against the body by the pressure of the liquid to be filtered. The fixation of the core 1c is as shown in Fig. 1. The tubular core 1d mounted in the outlet compartment of the filter apparatus differs from core 1c in that the embossed cones 3d project towards the exterior and the filter sleeve 2d is disposed against the internal circumference so as to be applied against the latter by the pressure of the liquid flowing in this case from the interior to the exterior. Otherwise the construction and operation are similar.

Figs. 5, 6, 7, 8 and 9 show by way of example a filter apparatus constructed for using cartridges of the type shown in Fig. 1. This filter apparatus comprises a casing 13 provided on two opposite sides with two tubular fittings 14 and 15 flanged for connection to pipes. One lateral side of this casing is provided with a removable cover 16. This cover has an internal transverse rib 17 perpendicular to the axes of the tubular fittings 14, 15 which rib is connected to another rib 18 as a continuation thereof. Rib 18 is integral with the other three side walls of the casing 13. The casing thus has in its interior a sort of frame with a rectangular opening in which is nested a cartridge supporting cup 19. One side of this frame is removable with cover 16. For mounting the cup-like member 19, it is provided with a peripheral flange 20 in which is formed a continuous groove 21 (Fig. 8), and the ribs 17, 18 are so dimensioned that they can engage the groove. Hence after removal of the plate 16 it is possible to withdraw from the side of the casing thus opened, the cartridge supporting cup-like member by sliding it in the two opposite lateral grooves (not shown in the drawing). To replace the said plate the procedure is reversed.

The ribs 17, 18 form along with the cup-like member a partition dividing the interior of the casing into two compartments 22 and 23. The liquid to be filtered is assumed to enter into the compartment 22 and to discharge from the compartment 23.

Since there exists a certain difference in pressure in the compartments 22, 23 it is necessary to provide a seal between the ribs 17, 18 and the groove 21. This consists of a flexible annular tube 24 having an external diameter equal to or slightly greater than the width of the grove 21. This tube contains a ring 25 formed of a helical spring capable of giving it a certain firmness and of pressing it into the bottom of the groove. After it is put in place this tube substantially fills the groove leaving room enough only for the entry of the rib 17 or 18. The pressure of the fluid being higher in the compartment 22 than in the compartment 23 the fluid has a tendency to flow from compartment 22 into compartment 23 directly between the rib and the groove in case of imperfect sealing or absence of a sealing gasket. According to the invention the fluid penetrating into the groove acts on the flexible tube and tends to crush or collapse it, thus compressing the air contained therein so that the tube is strongly applied against the bottom of the groove, against its sides on the outlet compartment side and against the rib. Sealing is thus perfectly guaranteed.

On the bottom of the cup-like partition and within the inlet compartment 22 are mounted several cartridges of the kind shown in Fig. 1.

Figs. 10–13 show how a simple filter cartridge may be formed by using a tubular body of embossed sheet metal but in replacing the sleeve of filter cloth by a filter material formed by a pile of discs having microgrooves on both faces thereof.

Figure 13:
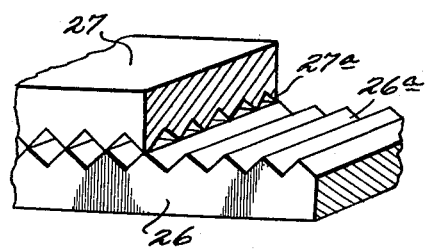
Fig. 13 is a perspective view on a larger scale showing two fragments of the superposed discs.

Fig. 13 shows the principle of this filter material. It shows on a very large scale two plane discs of suitable material in superposed position. On the upper face of the lower disc 26 are traced from one edge to the other parallel grooves 26a of a depth which is micrometric or of the order of one hundredth of a millimeter. On the lower face of the upper disc 27 are traced from edge to edge parallel grooves 27a also of a depth which is micrometric or of the order of one hundredth of a millimeter. The grooves of the two discs extend transversely to each other so that those of the lower disc cross those of the upper disc. Thus the grooves form channels of a certain cross-section allowing passage of liquid but retaining particles coarser than this cross-section.

Figure 12:
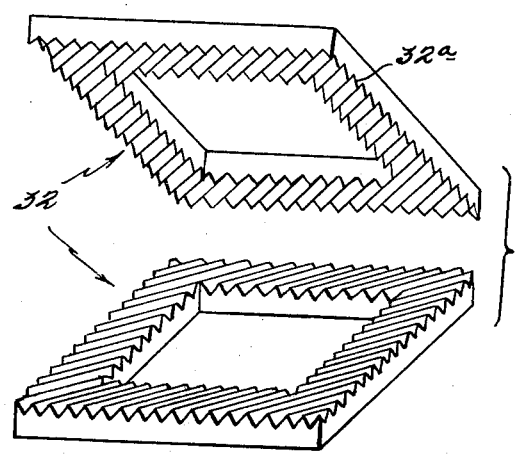
Fig. 12 is a diagrammatic view in perspective of two consecutive discs showing on one face only of them, the microgrooves on a much larger scale.

Based on this principle a filter cartridge is composed of discs which may be annular but are preferably in the form of square frames as shown in Fig. 12. It is necessary to hold the discs in a determined orientation such that the grooves in the contacting faces of two consecutive discs cross each other as described. For annular discs it is necessary to provide them with a notch adapted to engage a guide or to provide similar means. In any case it is essential to provide two groups of discs, for example having notches displaced by a certain angle relative to the direction of the grooves.

The use of discs in the form of square frames simplifies production since all the discs may be identical. It is necessary that the discs be stacked around a tubular body of square section as shown in Fig. 11 with consecutive discs alternately disposed so that their grooves cross each other in the manner clearly shown in Fig. 12. For simplicity the discs shown in this figure have grooves on one face only although actually they have similar grooves on both faces extending in the same direction. The form of construction of the cartridge with stacked discs as shown in Fig. 10 is only intended to be an example. In this case a cartridge supporting partition 28 having on the face directed towards the inlet compartment a square boss 29 exactly fitting the core 30 of square section. In the center of the boss is threadedly secured a rod 31 extending into the interior of the inlet compartment and screwthreaded at its free end. The discs 32 with microgrooves 32a in their surfaces are stacked on the core in the manner hereinbefore described. The lower disc rests on a sealing gasket 33. Another sealing gasket 34 is applied on the upper disc.

The clamping of the stack of discs is effected by a cover 35 similar to cover 9, but in which the gutter or peripheral recess 36 is provided with an outwardly extending flange 37 which bears on the sealing gasket 34. The cover 35 is in turn clamped in place by a nut 38 with expansion compensating means 39. The peripheral gutter 36 is disposed in such manner that it provides play at the upper end of the core during the compression of the discs.

Without departing from the scope of the invention the cartridge's core may be made of material other than metal, especially a plastic material. Other mounting devices and other cartridges may be used while remaining within the scope of the invention.

Having described my invention, I claim:
1. A filtering device comprising a filter cartridge composed of a rigid tubular body of sheet material having small perforated conical elements projecting from one surface thereof, the opposite surface being smooth, a filter sleeve covering the smooth surface of the body and having its ends turned over the end edges of the tubular body, a supporting plate for the cartridge and having a groove for receiving one end of the cartridge, an annular fluid sealing collar of U-shaped cross-section mounted on the one end of the cartridge and positioned in said groove, a rod fixedly mounted on said plate and positioned axially of the cartridge, a cover cap over the opposite end of the cartridge, and clamping means engaging the rod for holding the cartridge and cover cap in assembled relation with the plate.

2. A filtering device as set forth in claim 1, wherein a second filter cartridge composed of a tubular body, a sleeve of filter material, cap, rod, and clamping means are mounted on the opposite side of the supporting plate in axial alignment with the first-mentioned rod and cartridge, and wherein one filter sleeve is mounted over the exterior surface of one tubular body located on one side of the plate, and the second filter sleeve is mounted over the interior surface of the other tubular body located on the other side of the plate.

References Cited in the file of this patent

UNITED STATES PATENTS

| | | | |
|---|---|---|---|
| 756,519 | Kneuper | Aug. 8, | 1905 |
| 802,714 | Smith | Oct. 24, | 1905 |
| 1,093,684 | Campbell | Apr. 21, | 1914 |
| 1,224,213 | Rosenthal | May 1, | 1917 |
| 1,288,508 | Chapin | Dec. 24, | 1918 |
| 1,540,325 | Fuller | June 2, | 1925 |
| 2,265,550 | Smith | Dec. 9, | 1941 |
| 2,271,054 | Williams | Jan. 27, | 1942 |
| 2,584,387 | Harvuot | Feb. 5, | 1952 |
| 2,711,253 | Mills | June 21, | 1955 |
| 2,813,632 | Muller | Nov. 19, | 1957 |

FOREIGN PATENTS

| | | | |
|---|---|---|---|
| 15,491 | Great Britain | May 28, | 1908 |
| 1,108,096 | France | Aug. 17, | 1955 |